United States Patent Office.

OSCAR DOEBNER, OF BERLIN, AND WILHELM VON MILLER, OF MUNICH, ASSIGNORS TO THE CHEMISCHE FABRIK AUF ACTIEN VORM. E. SCHERING, OF BERLIN, GERMANY.

MANUFACTURE OF BASES CALLED CHINALDINES.

SPECIFICATION forming part of Letters Patent No. 309,935, dated December 30, 1884.

Application filed February 23, 1883. (Specimens.) Patented in Germany August 19, 1882, No. 24,317; in Belgium February 21, 1883, No. 60,517; in France February 21, 1883, No. 153,873; in England February 21, 1883, No. 956; in Luxemburg February 21, 1883, No. 255, and in Italy March 31, 1883, XXX, 157; XVI, 15,147.

*To all whom it may concern:*

Be it known that we, OSCAR DOEBNER, a subject of the Duke of Saxe-Meiningen, residing at Berlin, German Empire, and WILHELM VON MILLER, a subject of the King of Bavaria, residing at Munich, German Empire, have invented certain new and useful Improvements in the Process of Manufacturing Bases of the Chinolines called Chinaldine; and we do hereby declare the following to be a full, clear, and exact description of the invention, such as will enable others skilled in the art to which it appertains to make and use the same.

Our invention relates to the formation or production of bases allied in their composition and properties to the chinoline bases. We obtain these chinaldine bases by the reaction of acetaldehyde and certain other aldehydes upon the salts of primary aromatic amines, and we have called these "chinaldine bases," applicable in the arts for the manufacture of coloring-matter or for antiseptic and medicinal uses.

The invention consists in the method of forming or producing chinaldines or chinaldine bases. The simplest representative of these bases—namely, the chinaldine ($C_{10}H_9N$) obtained from aniline and aldehyde—is formed by the reaction expressed in the following equation: $C_6H_7N + 2C_2H_4O = C_{10}H_9N + 2H_2O + H_2$.

In carrying out our invention we proceed as follows: We take one hundred parts aniline, (or one hundred and fifteen parts toluidine, or one hundred and thirty parts xylidine,) one hundred and fifty parts paraldehyde, two hundred parts crude hydrochloric acid, and from two to five parts of chloride of aluminium. These are kept boiling from three to six hours. The product is then poured into water, and the filtered solution is saturated with soda-lye, and the base obtained by the reaction is purified by fractioning.

Although the above process has been found by experience to produce the best results, it may, however, be varied. For instance, ordinary aldehyde or acetal or croton aldehyde or aldol or lactic acid may be employed instead of the paraldehyde, and satisfactory results obtained; and hydrobromic acid, concentrated sulphuric acid, or phosphoric acid may be employed instead of hydrochloric acid. The reaction will also take place without the addition of chloride of aluminium, though it is materially assisted thereby, and other metallic salts—such as chloride of zinc or tin, or even the metals themselves—will produce the same results as the chloride of aluminium; nor is it necessary that the liquor should be boiled to effect the reaction, as that will take place at a considerably less temperature, although not so rapidly and completely, and in most cases high temperatures are preferable. The bases so obtained are employed in the production of coloring-matter or for antiseptic or medicinal purposes. They may be distilled without decomposition, and show in the presence of chemical reagents properties analogous to those of the chinoline bases, some of them having the following characteristic properties: Chinaldine, $C_{10}H_9N$, (from aniline,) is a fluid that smells like the chinoline and boils at 240°. Orthomethyl chinaldine, $(CH_3)C^{10}H_8N$, is fluid and boils at 249° to 251°. Paramethyl chinaldine, $(CH_3)C_{10}H_8N$, with the foregoing isomerics, is formed in colorless crystals having a melting-point of 59° to 60°.

The chinaldine or chinaldine bases obtained as above set forth may be converted into oxy, methoxy, and æthoxy chinaldines, and the latter may be converted into hydro combinations, as will be more fully described and specifically claimed in separate applications for Letters Patent.

Having now described our invention, what we claim, and desire to secure by Letters Patent of the United States, is—

1. The process of obtaining chinaldines, which consists in combining an acid and metallic salt, acting as a reducing agent, with aldehyde or its specified equivalents and a primary aromatic amine, and eliminating and purifying the base obtained by the reaction, as described.

2. As a new chemical product, chinaldines obtained by the reaction of aldehyde or its specified equivalents upon primary aromatic amines, as described.

In testimony whereof we affix our signatures in presence of two witnesses.

OSCAR DOEBNER.
WILHELM VON MILLER.

Witnesses:
GEORGE LOUBIER,
B. ROI.